(12) United States Patent
Levy et al.

(10) Patent No.: US 8,554,014 B2
(45) Date of Patent: Oct. 8, 2013

(54) ROBUST FAST PANORAMA STITCHING IN MOBILE PHONES OR CAMERAS

(75) Inventors: Noam Levy, Karmiel (IL); Meir Tzur, Haifa (IL)

(73) Assignee: CSR Technology Inc., Sunnyvale, CA (US)

( * ) Notice: Subject to any disclaimer, the term of this patent is extended or adjusted under 35 U.S.C. 154(b) by 937 days.

(21) Appl. No.: 12/549,254

(22) Filed: Aug. 27, 2009

(65) Prior Publication Data

US 2010/0054628 A1    Mar. 4, 2010

Related U.S. Application Data

(60) Provisional application No. 61/092,601, filed on Aug. 28, 2008.

(51) Int. Cl.
*G06K 9/36* (2006.01)
*G06K 9/20* (2006.01)
*G06K 9/00* (2006.01)

(52) U.S. Cl.
USPC ........... 382/284; 382/282; 382/313; 382/312; 382/107

(58) Field of Classification Search
USPC ......... 382/100, 107, 236, 282–284, 300, 312, 382/313
See application file for complete search history.

(56) References Cited

U.S. PATENT DOCUMENTS

| | | | |
|---|---|---|---|
| 6,023,588 A * | 2/2000 | Ray et al. | 396/20 |
| 6,075,905 A | 6/2000 | Herman et al. | |
| 6,677,981 B1 * | 1/2004 | Mancuso et al. | 348/36 |
| 6,717,608 B1 * | 4/2004 | Mancuso et al. | 348/36 |
| 6,731,305 B1 * | 5/2004 | Park et al. | 345/629 |
| 6,771,304 B1 * | 8/2004 | Mancuso et al. | 348/39 |
| 6,785,427 B1 | 8/2004 | Zhou | |
| 6,834,128 B1 | 12/2004 | Altunbasak et al. | |
| 6,885,392 B1 | 4/2005 | Mancuso et al. | |

(Continued)

FOREIGN PATENT DOCUMENTS

EP       2242262 A2    10/2010
WO    2008004150 A2    1/2008

OTHER PUBLICATIONS

U.S. Appl. No. 12/536,728, filed Aug. 6, 2009; Noam Levy, inventor.

(Continued)

*Primary Examiner* — Chan S Park
*Assistant Examiner* — Mia M Thomas
(74) *Attorney, Agent, or Firm* — Frommer Lawrence & Haug LLP; John W. Branch

(57) ABSTRACT

A camera that provides for a panorama mode of operation that employs internal software and internal acceleration hardware to stitch together two or more captured images to create a single panorama image with a wide format. Captured images are projected from rectilinear coordinates into cylindrical coordinates with the aid of image interpolation acceleration hardware. Matches are quickly determined between each pair of images with a block based search that employs motion estimation acceleration hardware. Transformation are found, utilizing regression and robust statistics techniques, to align the captured images with each other, which are applied to the images using the interpolation acceleration hardware. A determination is made for an optimal seam to stitch images together in the overlap region by finding a path which cuts through relatively non-noticeable regions so that the images can be stitched together into a single image with a wide panoramic effect.

24 Claims, 8 Drawing Sheets

(56) References Cited

U.S. PATENT DOCUMENTS

| | | |
|---|---|---|
| 6,930,703 B1 | 8/2005 | Hubel et al. |
| 7,197,192 B2 | 3/2007 | Edwards |
| 7,289,147 B2 | 10/2007 | Webb |
| 7,373,017 B2 | 5/2008 | Edwards et al. |
| 7,375,745 B2 | 5/2008 | Rai et al. |
| 7,424,218 B2 | 9/2008 | Baudisch et al. |
| 7,460,730 B2 | 12/2008 | Pal et al. |
| 7,639,897 B2 | 12/2009 | Gennetten et al. |
| 7,656,429 B2 | 2/2010 | Larson |
| 7,711,262 B2 * | 5/2010 | Park et al. .................. 396/296 |
| 7,746,375 B2 | 6/2010 | Ketelaars et al. |
| 7,746,404 B2 | 6/2010 | Deng et al. |
| 7,860,343 B2 | 12/2010 | Tico et al. |
| 7,965,332 B2 | 6/2011 | Chiu et al. |
| 8,279,288 B2 * | 10/2012 | Son et al. ................... 348/208.1 |
| 8,350,892 B2 * | 1/2013 | Hayashi ....................... 348/36 |
| 2001/0030693 A1 | 10/2001 | Fisher et al. |
| 2003/0063816 A1 * | 4/2003 | Chen et al. ................... 382/284 |
| 2003/0103683 A1 | 6/2003 | Horie |
| 2004/0189849 A1 | 9/2004 | Hofer |
| 2004/0201755 A1 | 10/2004 | Norskog |
| 2005/0089244 A1 | 4/2005 | Jin et al. |
| 2006/0050152 A1 * | 3/2006 | Rai et al. ..................... 348/218.1 |
| 2006/0182437 A1 * | 8/2006 | Williams et al. ............. 396/429 |
| 2007/0025723 A1 * | 2/2007 | Baudisch et al. ............ 396/287 |
| 2007/0081081 A1 | 4/2007 | Cheng |
| 2007/0237423 A1 | 10/2007 | Tico et al. |
| 2008/0043093 A1 | 2/2008 | Song |
| 2008/0056612 A1 | 3/2008 | Park et al. |
| 2008/0062254 A1 | 3/2008 | Edwards et al. |
| 2008/0074489 A1 * | 3/2008 | Zhang et al. .................. 348/36 |
| 2008/0074506 A1 | 3/2008 | Oh et al. |
| 2008/0158342 A1 | 7/2008 | Jeong et al. |
| 2008/0159653 A1 | 7/2008 | Dunki-Jacobs et al. |
| 2008/0170803 A1 | 7/2008 | Forutanpour |
| 2008/0291288 A1 | 11/2008 | Tzur et al. |
| 2009/0028462 A1 * | 1/2009 | Habuka et al. ................ 382/284 |
| 2009/0208062 A1 * | 8/2009 | Sorek et al. .................. 382/107 |
| 2010/0020190 A1 * | 1/2010 | Kawakatsu et al. ........ 348/222.1 |
| 2010/0033553 A1 | 2/2010 | Levy |
| 2010/0054628 A1 | 3/2010 | Levy et al. |
| 2010/0265313 A1 | 10/2010 | Liu et al. |
| 2012/0177253 A1 * | 7/2012 | Tseng et al. .................. 382/107 |
| 2013/0038680 A1 * | 2/2013 | Mashiah ........................ 348/36 |

OTHER PUBLICATIONS

Milgram, David L., *Computer Methods for Creating Photomosaics*, IEEE Transactions on Computers vol. C-24 issue 11, Nov. 1975, pp. 1113-1119.

Milgram, David L., *Adaptive Techniques for Photomosaicking*, IEEE Transactions on Computers vol. C-26 issue 11, Nov. 1977, pp. 1175-1180.

Fischler, Martin A. and Bolles, Robert C., Random Sample Consensus: A Paradigm for Model Fitting with Applications to Image Analysis and Automated Cartography, Communications of the ACM, vol. 24 No. 6, Jun. 1981, pp. 381-395.

Ha, Seong Jong et al., *Panorama Mosaic Optimization for Mobile Camera Systems*, IEEE Transactions on Consumer Electronics, vol. 53 issue 4, Nov. 2007, pp. 1217-1225.

International Searching Authority; International Search Report & Written Opinion dated Sep. 18, 2009 for PCT/US2009/053151, 7 pages.

International Search Report and Written Opinion for International Patent Application No. PCT/US2009/055265 mailed Oct. 15, 2009.

Search Report for British Patent Application No. GB1205402.9 dated Jul. 24, 2012.

Official Communication for U.S Appl. No. 12/536,728 mailed Nov. 2, 2012.

Official Communication for U.S. Appl. No. 12/536,728 mailed Feb. 27, 2013.

* cited by examiner

ROBUST FAST PANORAMA STITCHING IN MOBILE PHONES OR CAMERAS

CROSS-REFERENCE TO RELATED APPLICATIONS

This application is a utility patent application based on a previously filed U.S. Provisional Patent Application, Ser. No. 61/092,601 filed on Aug. 28, 2008, the benefit of which is hereby claimed under 35 U.S.C. §119(e) and incorporated herein by reference.

FIELD OF THE INVENTION

The invention is related to digital cameras, and in particular but not exclusively, to a method and device for stitching individual images into a panoramic view.

BACKGROUND OF THE INVENTION

Panoramic photography often employs specialized cameras, equipment and/or software, to capture a sequence of images that are reconstructed into a single image that takes the form of a wide strip with an elongated field of view. Panoramic photography is sometimes known as wide format photography. Typically, a panoramic image shows a field of view that is greater than that of a film camera equipped with a wide angle lens. And a typical film camera equipped with a wide angle lens can generally capture an image with a field of view that covers about 90 degrees across the diagonal of the captured image, e.g., a 35 millimeter film camera with a 22 degree lens can capture such an image. One way to capture a panoramic image is to mount a film camera on a tripod and as the camera is physically rotated about its axis, a succession of images of a scene are taken that are subsequently stitched together by physically cutting and pasting together strips of exposed film where the boundaries between the edges of the film are carefully aligned. In some cases, a wider than usual strip of film can be used with a film camera that employs special movable or stereo optics. In other film cameras, conventional format film, such as 35 millimeter, can be masked during the exposure in the camera to provide a wide aspect or panoramic effect.

Recently, the benefits of electronic photography have led to the general acceptance of digital cameras, which, unlike their film-based counterparts, store captured images in a digital memory such as flash memory. And some digital cameras can also provide a "panorama" feature, which allows a user of the digital camera to capture a sequence of adjacent images that are subsequently "stitched" together into a single image with a wide coverage of field. For example, some digital cameras with a panoramic feature can interface with a personal computer that provides software to externally join together two or more images at their edge boundaries to generate a single image with a wide panoramic format for display on the personal computer. And other digital cameras can employ internal software for in-camera stitching of multiple images into a single image with a wide panoramic effect. However, in-camera stitching based on software processes alone is often hampered by a relatively poor alignment of the images and a relatively long period of time to compose an image having a wide panoramic format based on a plurality of captured images of a scene.

BRIEF DESCRIPTION OF THE DRAWINGS

Non-limiting and non-exhaustive embodiments of the present invention are described with reference to the following drawings, in which.

DETAILED DESCRIPTION OF THE EMBODIMENTS OF THE INVENTION

Figure 1:
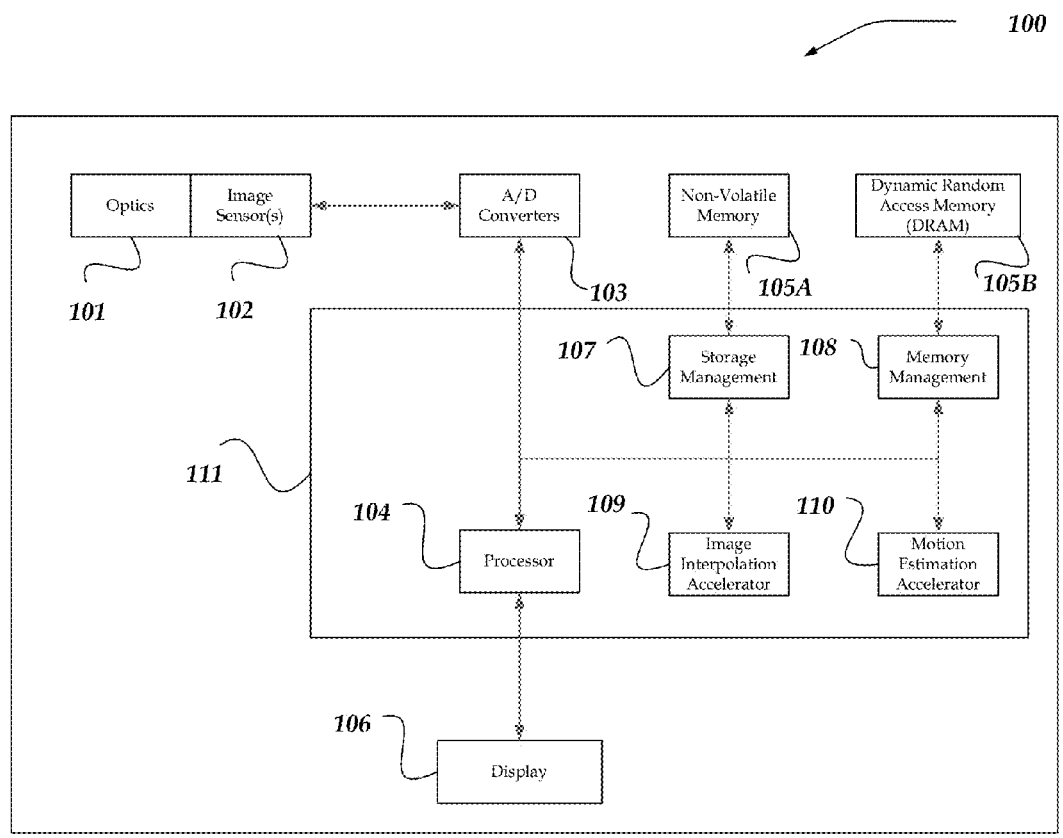
FIG. 1 shows a block schematic diagram of an exemplary digital camera.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items being connected, or an indirect connection through one or more passive or active intermediary devices.

Briefly stated, embodiments of the invention are related to a camera that provides for a panorama mode of operation that employs internal software and internal acceleration hardware to stitch together two or more captured images to create a single panorama image with a wide format. In the panorama mode, a plurality of captured images from a live view of a scene are initially projected/converted from rectilinear coordinates into cylindrical coordinates. This cylindrical projection employs look up tables (LUT), sparse sampling, and interpolation acceleration hardware to quickly generate the cylindrical coordinates from the rectilinear coordinates. Second, matches are quickly determined between each pair of images with a block based search that employs motion estimation acceleration hardware. Third, a set of affine transformations are identified that can use the Random Sample of the Consistency (RANSAC) process to align the captured images with each other. Fourth, the identified affine transformations are applied to the images using the interpolation acceleration hardware. Optionally, the color and exposure between the images may be adjusted by utilizing the knowledge of camera parameters for each image or by detecting color transformation between each image pair based on at least an analysis of the overlap (warp) region between adjacent images. The camera parameters may include, but are not limited to, exposure time, aperture, and white balance. Finally, a determination is made for an optimal seam to stitch images together in the overlap region by finding a path which cuts through relatively non-noticeable regions. And once the optimal seams are identified, the images are stitched together into a single image with a wide panoramic effect. Typically, the relatively non-noticeable regions are where the image pairs are substantially similar and there are relatively few details, edges, and the like.

The combination of internal software and specialized acceleration hardware enables significantly faster processing than other embodiments that do not employ the specialized acceleration hardware. Also, the invention provides for improved alignment (registration) and fewer artifacts in panoramic images. In particular, the invention compensates for un-modeled distortions such as camera motion through the affine warping of the projected images.

I. Exemplary Camera Device

FIG. 1 shows a block diagram of an embodiment of digital camera 100. Digital camera 100 includes a set of optics (e.g., one or more lenses and/or light guides) 101, a set of image sensors 102 optically coupled to the optics 101, a set of analog-to-digital (A/D) converters 103 having inputs electrically coupled to outputs of the image sensors 102, and integrated circuit 111 coupled to receive the outputs of A/D converters 103. The image sensors 102 may produce separate primary color signals such as Red, Green and Blue color signals. Integrated circuit 111 includes one or more processors 104, Image Interpolation Accelerator 109, Motion Estimation Accelerator 110, Memory Management circuit 108, and Storage Management circuit 107. Memory Management circuit 108 is electrically coupled to Dynamic Random Access Memory (DRAM) 105B, and Storage Management circuit 107 is electrically coupled to Non-Volatile Memory 105A. Non-Volatile Memory 105A can include flash memory, read-only memory, and the like. Camera 100 further includes a display device 106 coupled to the outputs of integrated circuit 111.

In operation, the image sensors 102 receive input light through the optics 101 and, in response, produce analog output primary color signals such as Red, Green and Blue to the A/D converters. The A/D converters convert those input color signals to digital form, which are provided to Integrated Circuit 111.

Integrated Circuit 111 includes processor 104 as well as specialized acceleration hardware, e.g., Image Interpolation Accelerator 109 and Motion Estimation Accelerator 110. Processor(s) 104 and Accelerators 109 and 110 may perform any of various well-known types of processing on those input color signals. The processor(s) 104 and Accelerators 109 and 110 may be or include, for example, any one or more of: a programmed microprocessor or digital signal processor (DSP), a microcontroller, an application specific integrated circuit (ASIC), a programmable logic device (PLD), etc. Integrated Circuit 111 may perform various processes, such as the process illustrated in FIG. 7 and/or 8.

The memory 105 may be or include, for example, any one or more of: flash memory, read-only memory, random access memory (RAM), etc.

Processed or raw color data can be output to the display device 106 for display and/or to one or more external devices, such as a computer, printer, video game console, another mobile electronic device, and the like.

II. Exemplary Cylindrical Projection Process

Figures 2A, 2B:
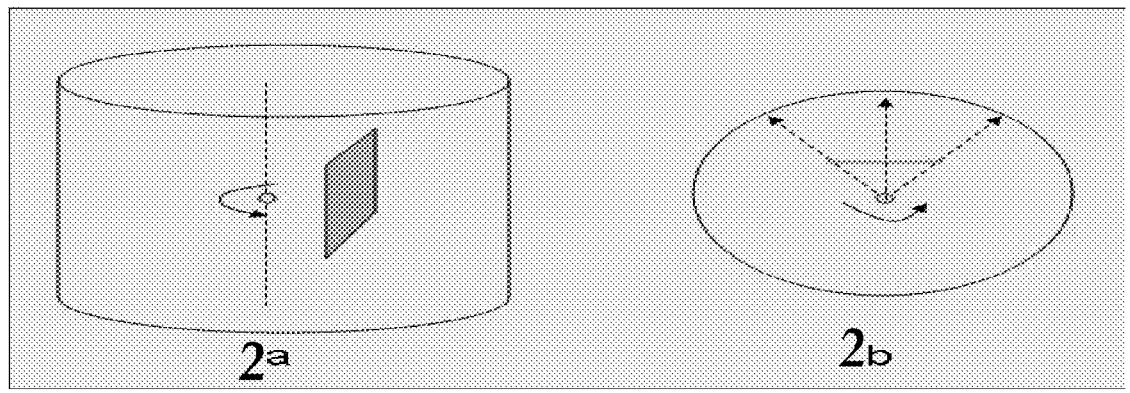
FIGS. 2a and 2b graphically illustrates a cylindrical side view and a cylindrical top down view of an image, where a projection is performed with back tracing rays from the sphere surface to a camera center through the image plane.

FIG. 2a graphically illustrates a cylindrical side view and FIG. 2b graphically illustrates a top down view. Projection is performed with back tracing rays from the sphere surface to the camera center through the image plane. The direction that the camera is rotated to capture the next image is also shown.

Figure 3:
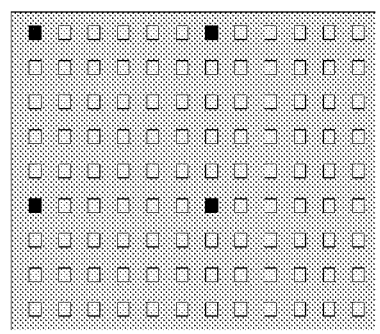
FIG. 3 shows an exemplary sparse grid of transformation coordinates in an image.

In at least one embodiment, look up tables (LUTs) are employed to calculate trigonometric functions required for the projection, and the cylindrical coordinate values are subsequently interpolated out of these LUTs. Also, an image can be warped quickly into a cylindrical projection by the use of dedicated acceleration hardware, such as Image Interpolation Accelerator 109 shown in FIG. 1. The acceleration hardware accepts a sparse grid of transformation coordinates, such as shown in FIG. 3. As shown in the figure, the processor would evaluate the transformation at the black pixel locations, while Image Interpolation Accelerator 109 evaluates at all other pixel locations by interpolation. Additionally, for each pixel, the transformation is evaluated by interpolating the transformation coordinates between these sparse grid points. By implementing the sparse grid transformation with hardware, such as Image Interpolation Accelerator 109, the image can be transformed into cylindrical coordinates at a relatively fast rate, e.g., three clock cycles per image pixel. In contrast, if substantially the same transformation was performed with a processor alone, the number of clock cycles per pixel would be significantly greater.

Figure 4:
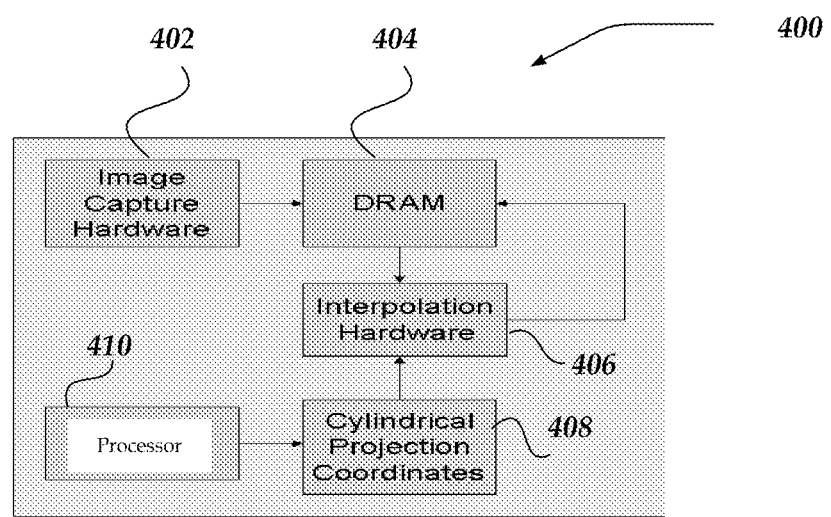
FIG. 4 illustrates a flow chart for quickly calculating the cylindrical projection of a captured image.

FIG. 4 illustrates a flow chart of exemplary process 400 for quickly calculating the cylindrical projection of a captured image. The process begins at block 402 where the image is captured and the logic flows to block 404 where the captured image is stored in memory such as DRAM. At block 410 a processor processes sparse grid points for the captured image into cylindrical projection coordinates at block 408, which are provided to image interpolation acceleration hardware at block 406. The image interpolation acceleration hardware interpolates the remaining cylindrical coordinates and uses them to project the image in DRAM; the image is then written back to the DRAM at block 404.

III. Exemplary Motion Estimation Process

For at least one embodiment, an assumption is made that the overlap between two consecutive and adjacent images is predetermined (e.g. 20% of the angular field of view is overlapping between each two consecutive images). Also, an assumption is made that these images are roughly aligned within a range of ±80 pixels in all directions.

Since the images are typically taken from a hand-held mobile device such as a camera, there are several reasons for the images to not be precisely aligned. One reason for poor alignment might be that when an image is taken, the user sees a relatively low resolution preview image. However, the full panorama image is much more detailed so misalignment which might have been unnoticeable on the low resolution preview image to the user could be quite noticeable when the panorama image is later viewed by the user on a high resolution monitor. Another reason for poor alignment might be that the user's hand shakes and moves randomly when the image is taken. Also, another reason for poor alignment could be that the user does not perform the ideal rotation motion between two consecutive images, which can cause un-modeled distortions between each pair of consecutive images.

To compensate for the alignment inaccuracy, automatic detection of the precise image alignment is necessary. The alignment is achieved by estimating the parameters of an image transformation that minimizes some error metric between the images. An example of such a parametric transformation is the affine transformation:

$$x'=a_{11}x+a_{12}y+a_{13}\ y'=a_{21}x+a_{22}y+a_{23}$$

The transformation is estimated and applied on the images after they have been warped to a cylindrical surface.

The affine transform is relatively simple to evaluate; it is a generalization of the translation transformation required in the ideal case of camera pure rotation; and it is relatively easy to estimate even in a system where fixed-point arithmetic is available.

Correspondences are found between two (projected) images, which are locations in one image which match locations in another image. This is done by selecting the overlap region of one of the images as a 'target', and the corresponding overlap region of the other image as 'reference', and performing block based motion search from target to reference.

For motion search, many techniques can be employed. However, in at least one embodiment, the motion search is a mean-normalized SAD (sum of absolute differences) based: i.e., the motion of a block of pixels in the target frame is determined by the location of the block in the reference frame for which the MNSAD is minimal. Also, the MNSAD algorithm is described in greater detail in at least a recent publication by Tzur, M., Pinto, V., and Pinhasov, E., in Published Patent Application No. 2008/0291288 A1, pub. date Nov. 27, 2008, entitled "TECHNIQUE OF MOTION ESTIMATION WHEN ACQUIRING AN IMAGE OF A SCENE THAT MAY BE ILLUMINATED WITH A TIME VARYING LUMINANCE."

$$MNSAD(x, y, u, v) =$$
$$\sum_{i=0}^{B_X-1}\sum_{j=0}^{B_Y-1} |I_T(x+i, y+j) - I_R(x+u+i, y+v+j) - M_T(x, y) + M_R(x+u, y+v)|$$

Where:

$$M_T(x, y) = \frac{1}{B_X B_Y} \sum_{i=0}^{B_X-1}\sum_{j=0}^{B_Y-1} I_T(x+i, y+j)$$

$$M_R(x, y) = \frac{1}{B_X B_Y} \sum_{i=0}^{B_X-1}\sum_{j=0}^{B_Y-1} I_R(x+i, y+j)$$

Then:

$$(MV_x(x, y), MV_y(x, y)) = \arg\min_{\substack{-A_X \le u \le A_X \\ -A_Y \le v \le A_Y}} (MNSAD(x, y, u, v))$$

Where $B_X$, $B_Y$ define the size of the block, and $A_X$, $A_Y$ define the search area.

The motion search is performed quickly by a specific hardware accelerator such as implemented on Integrated Circuit 111 with Motion Estimation Accelerator 110 in FIG. 1. Accelerator 110 accepts the reference and target images and returns a list of 'motion vectors', for each block in these images.

The motion search can be performed on a low resolution copy of the images, and then refined by performing an additional search in higher resolution. The motion search can be further improved by applying corner detection on the image, since corners are more likely to return reliable motion vectors. Also, robustness measure can be extracted by observing the MNSAD map as a function of the (u,v) motion vector and seeing if the minima that produced MV(x,y) is unique.

After motion search there is a set of correspondences in each image pair:

$$(x_i, y_i) \leftrightarrow (x_i', y_i')=(x_i+MV_x(x_i, y_i), y_i+MV_y(x_i, y_i))$$

An assumption is made that there is a set of K correspondences between the two images:

$$(x_i, y_i) \leftrightarrow (x_i', y_i')$$

And there is a need to estimate an affine function that links the images:

$$\hat{x}'=h_1x+h_2y+h_3\ \hat{y}'=h_4x+h_5y+h_6$$

By minimizing an SSE (sum of squared error) energy function:

$$\text{minimize} \sum_{i=1}^{K} \|(x_i', y_i')^T - (\hat{x}_i', \hat{y}_i')^T\|^2$$

This is a linear regression problem with a closed solution, which we will show explicitly below.

The correspondences reported by motion estimation do not, in general, contain only 'true' correspondences. There can be many factors which contribute to 'false' correspondences:

Local Motion—if an object moved within the scene, than its motion is not related to the global displacement caused by the camera rotation. The motion vectors related to it should be discarded.

Disappearance/Occlusion—a target block could, in some cases, not exist in the reference image; this can be because it has moved out of the image area or been occluded due to local motion/motion parallax. In this case false motion vectors are usually introduced.

False Motion—though the motion estimation flow is robust, it is not perfect. Sometimes the search yields erroneous motion vectors; these should be discarded.

A RANSAC (random sample consensus) algorithm is employed for the estimation of the transformation from these correspondences. The RANSAC algorithm is discussed in greater detail in at least an academic publication by Fischler, Martin A. and Bolles, Robert C., entitled "RANDOM SAMPLE CONSENSUS: A PARADIGM FOR MODEL FITTING WITH APPLICATIONS TO IMAGE ANALYSIS AND AUTOMATED CARTOGRAPHY", Communications of the ACM, vol. 24, num. 6, June 1981. In the process, transformation estimates and reject outliers are iteratively built. The final transformation is calculated by taking the group of all inliers (which are labeled I), and estimating a transformation by the least squares (linear regression) equations which solves the minimization problem presented above.

$$\begin{pmatrix} a_{11} \\ a_{12} \\ a_{13} \end{pmatrix} = \begin{pmatrix} \Sigma x_i^2 & \Sigma y_i x_i & \Sigma x_i \\ \Sigma y_i x_i & \Sigma y_i^2 & \Sigma y_i \\ \Sigma x_i & \Sigma y_i & N \end{pmatrix}^{-1} \begin{pmatrix} \Sigma x_i x_i' \\ \Sigma y_i x_i' \\ \Sigma x_i' \end{pmatrix}$$

$$\begin{pmatrix} a_{21} \\ a_{22} \\ a_{23} \end{pmatrix} = \begin{pmatrix} \Sigma x_i^2 & \Sigma y_i x_i & \Sigma x_i \\ \Sigma y_i x_i & \Sigma y_i^2 & \Sigma y_i \\ \Sigma x_i & \Sigma y_i & N \end{pmatrix}^{-1} \begin{pmatrix} \Sigma x_i y_i' \\ \Sigma y_i y_i' \\ \Sigma y_i' \end{pmatrix}$$

Where the summation is over $i \in I$, and $N = |I|$

Once an affine transformation has been estimated linking each pair of images, each image is rendered on the panorama canvas by applying the appropriate affine transformation. This is done very quickly using the aforementioned Image Interpolation Accelerator hardware.

IV. Exemplary Image Stitching

The final stage in generating the panoramic image is finding the optimal seam between each pair of consecutive adjacent images which decides where to locate pixels of each image. This is done by selecting the path of least energy which crosses the overlap region. The energy which is minimized is given by:

$$E(x, y) = |I_2(x, y) - I_1(x, y)| + \left|\frac{\partial I_1(x, y)}{\partial x}\right| + \left|\frac{\partial I_1(x, y)}{\partial y}\right| + \left|\frac{\partial I_2(x, y)}{\partial x}\right| + \left|\frac{\partial I_2(x, y)}{\partial y}\right|$$

The path is found using the dynamic programming algorithm which is described in greater detail in at least a publication by Milgram, David. L., entitled "ADAPTIVE TECHNIQUES FOR PHOTOMOSAICING," IEEE Transactions On Computers, Vol. C-26 Issue 11, November 1977 and also described in greater detail in at least another publication by Milgram, David L., entitled "COMPUTER METHODS FOR CREATING PHOTOMOSAICS," IEEE Transactions on Computers, Vol. C-24 issue 11, November 1975.

In this way, the path avoids pixels in which there is significant difference between the two images but also avoids edges and detailed regions characterized by large gradient size.

V. Exemplary Panoramic Image Building

Figure 5:
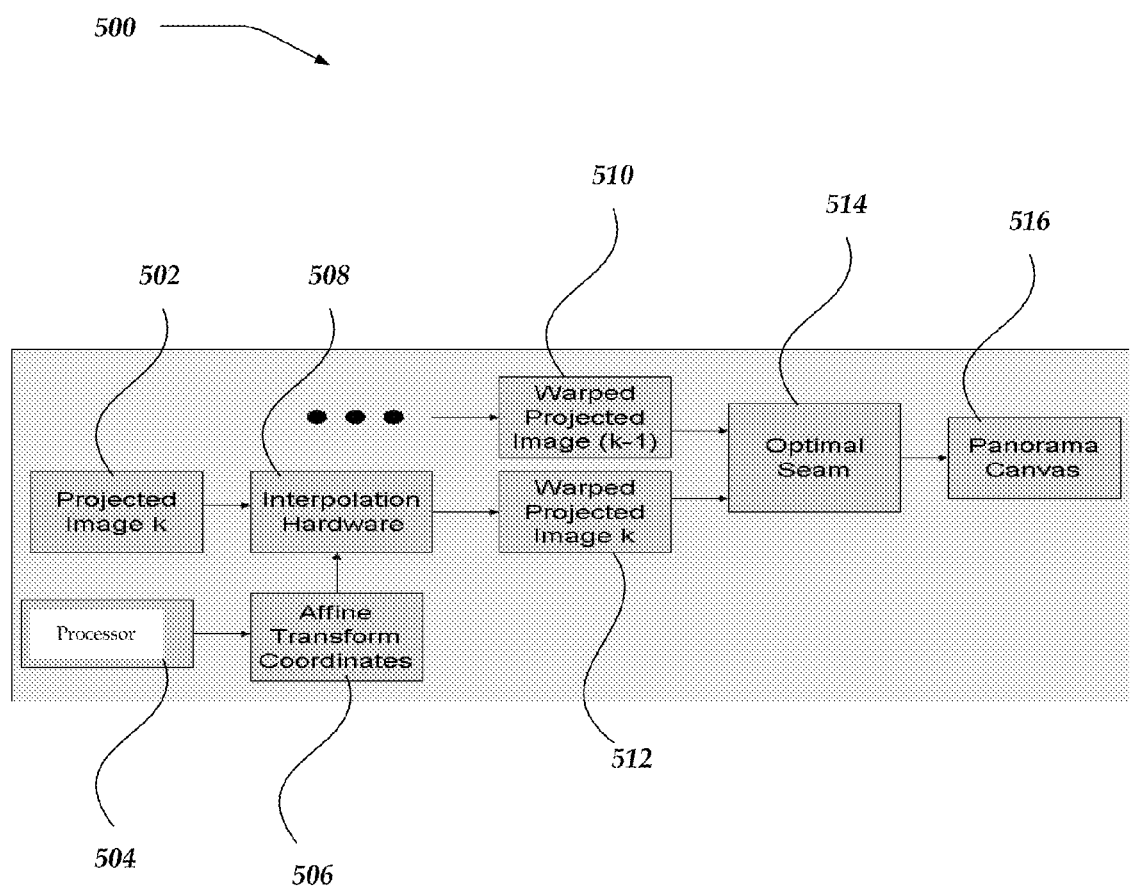
FIG. 5 shows a flow chart for building a panorama canvas.

A flow chart of exemplary process 500 for building the panorama canvas is shown in FIG. 5. At block 502, a projected image (k) in cylindrical coordinates is provided at block 508 to image interpolation acceleration hardware. Also, at block 504, a processor processes at least projected image (k) to provide at block 506 the affine transform coordinates for the projected image (k). Moving from block 508 to block 512, the logic provides a warped version of the projected image (k). The process describe above in this paragraph is repeated for the next consecutive projected image (k–1) to provide a warped version of the next consecutive projected image (k–1) at block 510. At block 514, the optimal seam between the warped projected image (k) and the next consecutive warped projected image (k–1) is generated. Moving to block 516, the panorama canvas is assembled by joining the warped projected image (k) and the next consecutive warped projected image (k–1) along the generated optimal seam. The process further repeats until the consecutive projected images are all joined together along an optimal seam.

Figure 6:
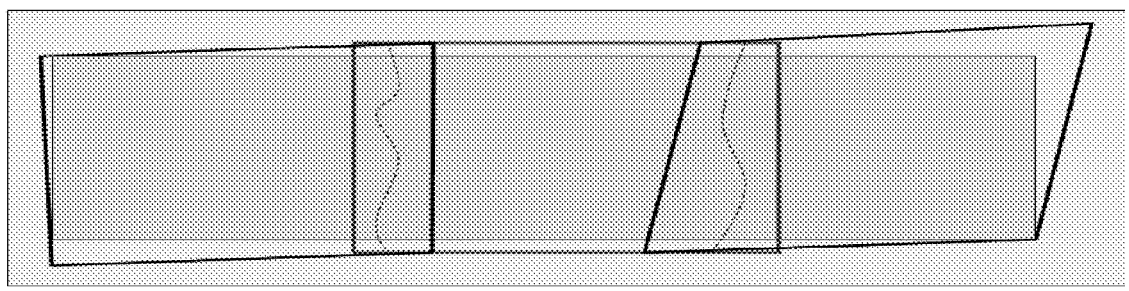
FIG. 6 illustrates the result of the flow chart shown in FIG. 5, where the panorama canvas (filled rectangle) is chosen as a bounded rectangle, and the outline of each image is warped using affine transformations onto the canvas.

Additionally, FIG. 6 illustrates the result of process 500 shown in FIG. 5. The panorama canvas (filled rectangle) is chosen as a bounded rectangle, the outline of each image is warped using affine transformations onto the canvas. The optimal seams (dashed lines) are shown between each pair of images.

Figure 7:
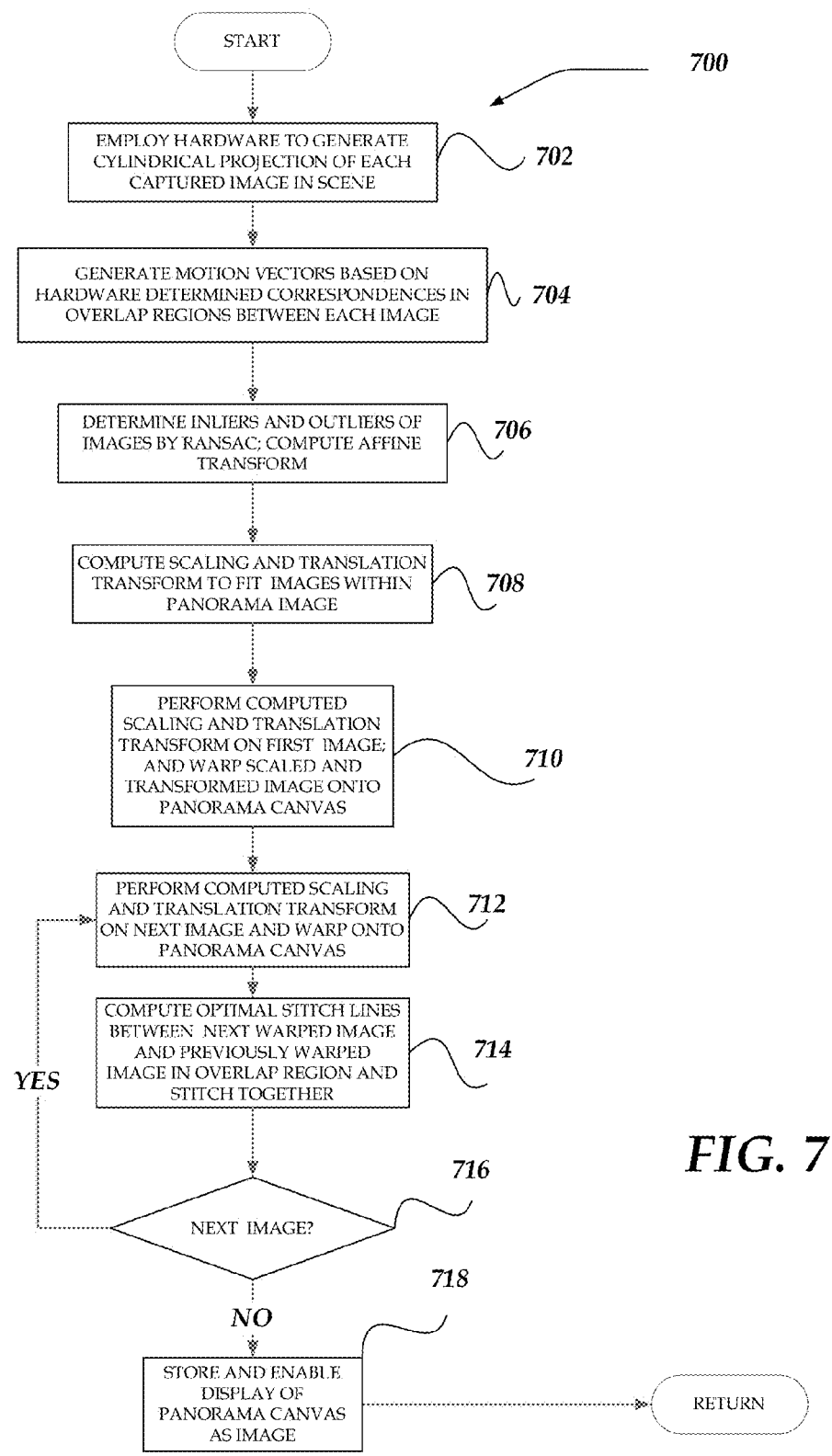
FIG. 7 is shows a flow chart for creating a panoramic image from consecutive captured images.

FIG. 7 illustrates an overview of process 700 for creating a panoramic image from consecutive captured images. Moving from a start block, the process flows to block 702 where image interpolation acceleration hardware and a processor are employed to quickly generate cylindrical coordinate projections of each captured consecutive image in a scene. At block 704, correspondences in an overlap region between two consecutive images are detected with motion estimation acceleration hardware. At block 706, inliers and outliers of images are computed by RANSAC, and affine transformations for the images are computed.

At block 708, a scaling and translation transforms are computed so that all of the captured consecutive images can fit onto a panoramic image canvas. At block 710, a first consecutive image is scaled and translated and then warped onto the panoramic canvas. At block 712, the computed scaling and translation transformations are performed on the next consecutive image which is warped onto the panoramic canvas. At block 714, the optimal stitch lines between the previous and next warped image in an overlay region are stitched together in the panoramic canvas.

At decision block 716, a determination is made as to whether a next image is available. If true, the process loops back to block 712 and performs substantially the same actions as listed above. However, if the determination at decision block 712 is negative, then the process steps to block 718 where the panoramic canvas is stored as a single image for subsequent display to a user. The process then returns to performing other actions.

VI. Exemplary Image Interpolation Acceleration Hardware

The Image Interpolation Acceleration hardware is employed to quickly perform any kind of transformation to an image.

Assume there is a transformation for the image coordinates (x',y')=T(x,y). (x',y') are coordinates in the output image (for example, for a cylindrical transformation (x',y') is actually ($\phi$,h)). Assume also that the hardware can evaluate the inverse transformation (x,y)=T$^{-1}$(x',y').

Warping an image means, for each output pixel at (x',y'):

$(x,y)=T^{-1}(x',y')$

If (x,y) is inside the input image
OutputPixel(x',y') = Interpolate from the input pixels around (x,y)
Otherwise
OutputPixel(x',y')=0

Figure 8:
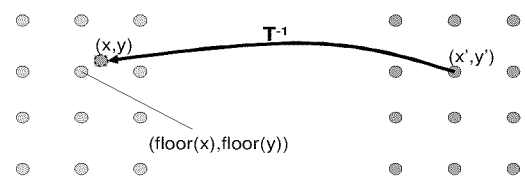
FIG. 8 graphically illustrates how each output pixel at coordinates (x',y') is transferred to the input image coordinates (x,y) via the inverse transform $T^{-1}$.

FIG. 8 graphically shows how each output pixel at coordinates (x',y') is transferred to the input image coordinates (x,y) via the inverse transform T$^{-1}$; the output pixel is generated by interpolating values from the nearby input pixels.

The actual pixel value may be calculated by the bi-linear interpolation algorithm:

$m=\text{floor}(x)$ $fm=x-m$ $n=\text{floor}(y)$ $fn=y-n$

OutputPixel(x',y')=(1−fm)*(1−fn)*InputPixel(m,n)+
 fm*(1−fn)*InputPixel(m+1,n)+(1−fm)
 *fn*InputPixel(m,n+1)+fm*fn*InputPixel(m+1, n+1)

Assuming that there is prepared sparse samples of the inverse transformation. i.e., there is stored in memory a set of numbers $TX_{i,j}$ and $TY_{i,j}$ so that:

$$(TX_{i,j}, T_{i,j}) = T^{-1}(x' = B_X \cdot i, y' = B_Y \cdot j)$$

Where $B_x$ and $B_y$ are the width and height of the sparse grid blocks. In this case, there can be given an approximation of the inverse transformation for any output pixel (x',y') by interpolating between the values, in a very similar manner to which the pixel values are interpolated.

T(x',y') is calculated by $$i = \text{floor}(x'/Bx)$$

$$fi = x'/Bx - i$$

$$j = \text{floor}(y'/By)$$

$$fj = y'/By - y$$

$$T(x',y') \approx (1-fi)^*(1-fj)^*(TX_{i,j}, TY_{i,j}) + fi^*(1-fj)^*(TX_{i+1,j}, TY_{i+1,1}) + (1-fi)^*fj^*(TX_{i,j+1}, TY_{i,j+1}) + fi^*fj^*(TX_{i+1,j+1}, TY_{i+1,j+1})$$

In this way the hardware can very quickly evaluate any transformation, even the cylindrical transformation which involves evaluation of trigonometric functions.

The sparse grid can be pre-calculated in the camera calibration stage or calculated in real time by CPU. Since there are not many values in the sparse grid (typical values that are used for Bx and By are 16, so there are only 1/256 values in sparse grid as there are pixels in the image), it would not take long to evaluate every element in it. However for systems which do not have the resources to even do this, the look up table method can be utilized to quickly evaluate the trigonometric functions related to the cylindrical transformation.

The backwards transformation from cylindrical coordinates is given by:

$$(x,y) = T^{-1}(\phi, h) = (f \tan(\phi), f \cdot h \cdot \sec(\phi))$$

This transformation can be approximated quickly if there is a look up table of the tan(.) and sec(.) functions. For example, a look up table of the tan(.) function is a set of values Ti, i=0, . . . ,N−1 such that:

$$T_i = \tan\left(\varphi_{min} + i \cdot \frac{\varphi_{max} - \varphi_{min}}{N}\right)$$

The table covers value through [$\phi_{min}$, $\phi_{max}$]. To calculate an approximation of tan(.) value within the range, the lookup table can be used by interpolating between its values. Bilinear interpolation is used:

tan($\phi$) for $\phi$ in [$\phi_{min}$, $\phi_{max}$) using the LUT $$i = \text{floor}(\phi - \phi_{min})/N)$$

$$fi = (\phi - \phi_{min})/N - i$$

$$\tan(\phi) \approx (1-fi)^* T_i + fi^* T_{i+1}$$

By using look up tables of 128 values each in the range of [0, π/4], the image warping results are visually undistinguishable from the transformation which uses the precise functions.

VII. Exemplary Motion Estimation Acceleration Hardware

The exemplary motion estimation hardware is capable of quickly locating motion vectors between a target and reference image by minimizing the MNSAD over some region as stated above. In some embodiments it is also capable of detecting corners in the target image; corner detection may be performed using any of the well known algorithms used in the art, and it is useful for specifying specific points from which the motion estimation should originate The motion estimation hardware reads the target and reference images from memory and performs the arithmetic and accounting to produce a list of motion vectors.

Figure 9:
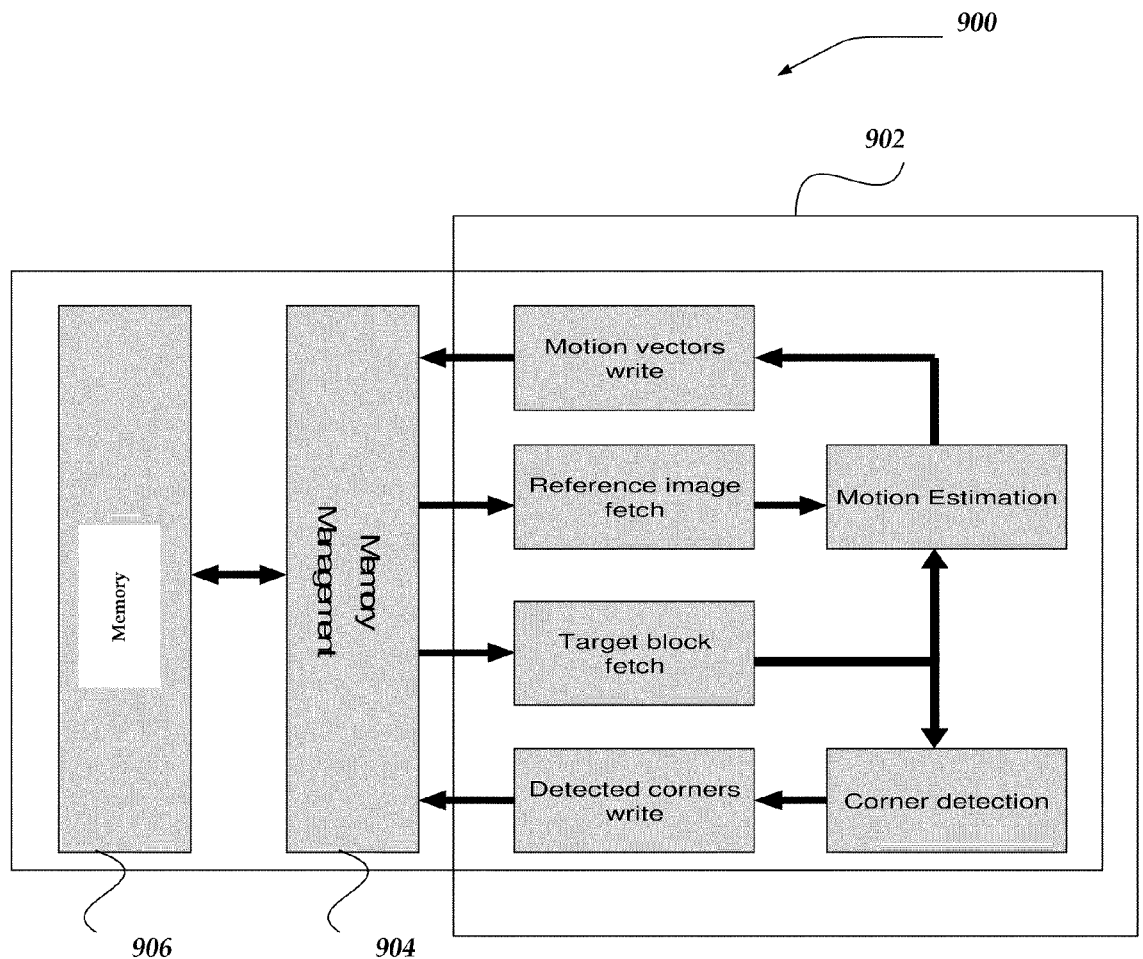
FIG. 9 illustrates an exemplary schematic of components included in motion estimation acceleration hardware for an image.

FIG. 9 illustrates an exemplary schematic 900 of components included in image motion estimation acceleration hardware 902. As shown, hardware 902 is coupled to memory management circuit 1404 which is coupled to memory 906. Although corner detection is shown as part of the motion estimation acceleration hardware, in some embodiments the corner detection process may not be included with the hardware.

It will be understood that each block of the flowchart illustrations, and combinations of blocks in the flowcharts, may be implemented by a combination of hardware-based systems and software instructions. The software instructions may be executed by a processor to cause a series of operational steps to be performed by the processor to produce a computer-implemented process such that the instructions, which execute on the processor, provide steps for implementing some or all of the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The various embodiments have been described above in light of certain mathematical relationships. A person skilled in the art would note that these mathematical relationships are subject to many possible computer implementations, which are all within the scope of the invention. Furthermore, it should be noted that the language of mathematics allows many ways to convey the same relationship. All such variations of the above described equations and relationships are naturally within the scope of the invention.

The above specification, examples, and data provide illustrative embodiments of the present invention. The above specification provides a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for internally generating a panorama image on a mobile device, comprising:
  capturing a plurality of images, wherein a first circuit is employed to accelerate a projection of each captured image into cylindrical coordinates;
  employing a second circuit to accelerate determining a plurality of motion vectors for each overlap region between each captured image, wherein correspondences between consecutive images are based at least in part on the determined motion vectors;
  based on said correspondences, determining pair-wise transformations to precisely align each pair of images and a global transformation to fit all images into a single rectangular panoramic image;

warping each image into the panorama image, based on said transformations; and stitching each pair of consecutive warped images together along a determined stitch line between each corresponding pair of consecutive warped images to minimize visual artifacts, wherein the determined stitch Inc corresponds to a selected path of least energy that crosses an overlap region between the corresponding pair of consecutive warped images.

2. The method of claim 1, further comprising enabling a display of the panorama image to a user.

3. The method of claim 1, wherein the determined transformations are affine and are found by using linear regression.

4. The method of claim I, further comprising determining inliers and outliers among the correspondences between each pair of the plurality of captured images based at least in part on a Random Sample Consensus process.

5. The method of claim 1, wherein the visual artifacts between each consecutive captured image are reduced at least in part by passing the stitch line through portions of the overlap regions of the consecutive images that are at least one of similar, without substantial edges, or without substantial detail.

6. The method of claim 1, wherein the second circuit includes corner detection for improved reliability of a motion estimation process in the plurality of captured images.

7. The method of claim 1, wherein the first circuit provides for interpolating a sparse grid of points with a look up table to accelerate the cylindrical coordinate projection for the plurality of captured images.

8. The method of claim 1, further comprising estimating motion for the plurality of images based on at least a Mean Normalized Sum of Absolute Differences (MNSAD).

9. A mobile device for internally generating a panorama image of a scene, comprising:
   an image capture device that is arranged to capture a plurality of images;
   a first circuit that is arranged to accelerate a projection of each captured image into cylindrical coordinates;
   a second circuit that is arranged to accelerate determining a plurality of motion vectors for each overlap region between each captured image, wherein correspondences between consecutive images are based at least in part on the determined motion vectors; and
   a processor that is configured to enable actions, including:
      based on said correspondences, determining pair-wise transformations to precisely align each pair of images and a global transformation to fit all images into a single rectangular panoramic image;
      warping each image into the panorama image, based on said transformation; and
      stitching each pair warped images together along a determined stitch line between each corresponding pair of consecutive warped images to minimize visual artifacts, wherein the determined stitch line corresponds to a selected path of least energy that crosses an overlap region between the corresponding pair of consecutive warped images.

10. The mobile device of claim 9, further comprising a display for displaying the panorama image to a user.

11. The mobile device of claim 9, wherein the determined transformations are affine and are found by using linear regression.

12. The mobile device of claim 9, wherein the processor performs further actions comprising determining inliers and outliers among the correspondences between each pair of the plurality of captured images based at least in part on a Random Sample Consensus process.

13. The mobile device of claim 9, wherein the visual artifacts between each consecutive captured image are reduced at least in part by passing the stitch line through portions of the overlap regions of the consecutive images that are at least one of similar, without substantial edges, or without substantial detail.

14. The mobile device of claim 9, wherein the second circuit includes corner detection for improved reliability of a motion estimation process in the plurality of captured images.

15. The mobile device of claim 9, wherein the first circuit provides for interpolating a sparse grid of points with a look up table to accelerate the cylindrical coordinate projection for the plurality of captured images.

16. The mobile device of claim 9, wherein the processor enables further actions comprising estimating motion for the plurality of images based on at least a Mean Normalized Sum of Absolute Differences (MNSAD).

17. An article of manufacture including a processor-readable non-transitive storage medium having processor-executable code encoded therein, which when executed by one or more processor devices, enables actions for internally generating a panorama image of a scene on a mobile device, comprising:
   capturing a plurality of images, wherein a first circuit is employed to accelerate a projection of each captured image into cylindrical coordinates;
   employing a second circuit to accelerate determining a plurality of motion vectors for each overlap region between each captured image, wherein correspondences between consecutive images are based at least in part on the determined motion vectors;
   based on said correspondences, determining pair-wise transformations to precisely align each pair of images and a global transformation to fit all images into a single rectangular panoramic image;
   warping each imago into the panorama image, based on said transformation; and
   stitching each pair of consecutive warped images together along a determined stitch line between each corresponding pair of consecutive warped images to minimize visual artifacts, wherein the determined stitch line corresponds to a selected path of least energy that crosses an overlap region between the corresponding pair of consecutive warped images.

18. The article of manufacture of claim 17, further comprising enabling a display of the panorama image to a user.

19. The article of manufacture of claim 17, wherein the determined transformations are affine and are found by using linear regression.

20. The article of manufacture of claim 17, further comprising determining inliers and outliers among the correspondences between each pair of the plurality of captured images based at least in part on a Random Sample Consensus process.

21. The article of manufacture of claim 17, wherein the visual artifacts between each consecutive captured image are reduced at least in part by passing the stitch line through portions of the overlap regions of the consecutive images that are at least one of similar, without substantial edges, or without substantial detail.

22. The article of manufacture of claim 17, wherein the second circuit includes corner detection for improved reliability of a motion estimation process in the plurality of captured images.

23. The article of manufacture of claim 17, wherein the first circuit provides for interpolating a sparse grid of points with a look up table to accelerate the cylindrical coordinate projection for the plurality of captured images.

24. The article of manufacture of claim 17, further comprising estimating motion for the plurality of images based on at least a Mean Normalized Sum of Absolute Differences (MNSAD).

* * * * *

UNITED STATES PATENT AND TRADEMARK OFFICE
CERTIFICATE OF CORRECTION

PATENT NO.         : 8,554,014 B2
APPLICATION NO.    : 12/549254
DATED              : October 8, 2013
INVENTOR(S)        : Noam Levy et al.

It is certified that error appears in the above-identified patent and that said Letters Patent is hereby corrected as shown below:

On Title Page 2, Item (56), under "OTHER PUBLICATIONS", in Column 2, Line 21, delete "U.S" and insert -- U.S. --, therefor.

In the Specification

In Column 2, Line 16, delete "is shows" and insert -- shows --, therefor.

In Column 2, Line 23, delete "image;" and insert -- image. --, therefor.

In Column 8, Line 49, delete "=0" and insert -- =0. --, therefor.

In Column 9, Lines 19-21, delete "
$$T(x',y') \approx (1-fi)^*(1-fj)^*(TX_{i,j}, TY_{i,j}) + fi^*(1-fj)^*(TX_{i+1,j}, TY_{i+1,1}) + (1-fi)^*fj^*(TX_{i,j+1}, TY_{i,j+1}) + fi^*fj^*(TX_{i+1,j+1}, TY_{i+1,j+1})$$
" and insert --
$$T(x',y') \approx (1-fi)^*(1-fj)^*(TX_{i,j}, TY_{i,j}) + fi^*(1-fj)^*(TX_{i+1,j}, TY_{i+1,j}) + (1-fi)^*fj^*(TX_{i,j+1}, TY_{i,j+1}) + fi^*fj^*(TX_{i+1,j+1}, TY_{i+1,j+1})$$
--, therefor.

In Column 10, Line 3, delete "originate" and insert -- originate. --, therefor.

In the Claims

In Column 11, Line 6, in Claim 1, delete "stitch Inc" and insert -- stitch line --, therefor.

In Column 11, Line 15, in Claim 4, delete "claim I," and insert -- claim 1, --, therefor.

Signed and Sealed this
Twenty-seventh Day of May, 2014

Michelle K. Lee
*Deputy Director of the United States Patent and Trademark Office*

CERTIFICATE OF CORRECTION (continued)
U.S. Pat. No. 8,554,014 B2

In Column 11, Line 53, in Claim 9, delete "each pair warped" and insert -- each pair of consecutive warped --, therefor.

In Column 12, Line 39, in Claim 17, delete "imago" and insert -- image --, therefor.